United States Patent
McBranch (10) Patent No.: US 7,125,578 B1
(45) Date of Patent: Oct. 24, 2006

(54) PHOTOINDUCED CHARGE-TRANSFER MATERIALS FOR NONLINEAR OPTICAL APPLICATIONS

(75) Inventor: Duncan W. McBranch, Santa Fe, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 09/298,297

(22) Filed: Apr. 23, 1999

(51) Int. Cl.
*B05D 5/06* (2006.01)

(52) U.S. Cl. ............ 427/162; 427/165; 427/169; 427/58; 427/108; 427/402; 427/430.1; 427/443.2

(58) Field of Classification Search ............ 427/58, 427/108, 162, 164, 165, 169, 402, 430.1, 427/443.2
See application file for complete search history.

(56) References Cited

U.S. PATENT DOCUMENTS

| | | | | |
|---|---|---|---|---|
| 5,153,680 A | * | 10/1992 | Naito et al. | 430/270.15 |
| 5,294,402 A | * | 3/1994 | Schrepp et al. | 422/57 |
| 5,443,955 A | * | 8/1995 | Cornell et al. | 435/7.21 |
| 5,506,420 A | * | 4/1996 | Kossovsky et al. | 257/40 |
| 5,520,968 A | * | 5/1996 | Wynne et al. | 428/1.31 |
| 5,741,442 A | | 4/1998 | McBranch et al. | 252/582 |
| 5,882,785 A | * | 3/1999 | Hollins et al. | 428/333 |
| 6,106,948 A | * | 8/2000 | Wang et al. | 428/413 |
| 6,107,561 A | * | 8/2000 | Thompson | 136/252 |
| 6,344,272 B1 | * | 2/2002 | Oldenburg et al. | 428/403 |
| 6,441,395 B1 | * | 8/2002 | Yu et al. | 257/40 |
| H2046 H | * | 9/2002 | Roberts et al. | 427/162 |
| 6,445,489 B1 | * | 9/2002 | Jacobson et al. | 359/296 |
| 6,850,003 B1 | * | 2/2005 | Pichler et al. | 313/506 |

FOREIGN PATENT DOCUMENTS

EP 0 482 920 A2 * 4/1995

OTHER PUBLICATIONS

D. McBranch, Curr. Opin. Solid-State and Mater. Sci., 3, 203 (1998).
K. Lee et al., Phys. Rev. B54, 10525 (1996).
E. Maniloff et al., Opt. Comm. 141, 243 (1997).
S. R. Marder et al., Nature 388, 845 (1977).
D. McBranch, Curr. Opin. Solid-State and Mater. Sci., 3. 203 (1998).
H. E. Katz et al., Science 254, 1485 (1991).
G. Decher et al., Thin Solid Films 210, 831 (1992).
T. M. Cooper et al., Langmuir 11, 2713 (1991).
A. C. Fou et al., J. Appl. Phys. 79, 7501 (1996).

(Continued)

*Primary Examiner*—Alain L. Bashore
(74) *Attorney, Agent, or Firm*—Robert P. Santandrea; Samuel M. Freund (57) ABSTRACT

A method using polyelectrolyte self-assembly for preparing multi-layered organic molecular materials having individual layers which exhibit ultrafast electron and/or energy transfer in a controlled direction occurring over the entire structure. Using a high molecular weight, water-soluble, anionic form of poly-phenylene vinylene, self-assembled films can be formed which show high photoluminescence quantum efficiency (QE). The highest emission QE is achieved using poly(propylene-imine) (PPI) dendrimers as cationic binders. Self-quenching of the luminescence is observed as the solid polymer film thickness is increased and can be reversed by inserting additional spacer layers of transparent polyelectrolytes between each active conjugated layer, such that the QE grows with thickness. A red shift of the luminescence is also observed as additional PPV layers are added. This effect persists as self-quenching is eliminated. Charge transfer superlattices can be formed by additionally incorporating $C_{60}$ acceptor layers.

24 Claims, 6 Drawing Sheets

OTHER PUBLICATIONS

S. Wang et al., Macromolecular Rapid Comm. 18, 451 (1997).
Y. Lvov et al., Thin Solid Film 300, 107 (1997).
K. M. Lenahan et al., Adv. Mater. 10, 853 (1998).
V. A. Kabanov et al., Macromolecules 51, 5142 (1998).
M. Yan et al., Phys. Rev. Lett. 72, 1104 (1994).
S. Dante et al., Langmuir 15, 193 (1999).
F. Li et al., J. Mater. Chem. 7, 1245 (1997).
J. Mashl et al., J. Chem. Phys 110, 2219 (1999).

* cited by examiner

Fig. 1

MPS-PPV

Fig. 2a poly (propylene imine) dendrimer

Fig. 2b

Sulfonated $C_{60}$

PHOTOINDUCED CHARGE-TRANSFER MATERIALS FOR NONLINEAR OPTICAL APPLICATIONS

This invention was made with government support under Contract No. W-7405-ENG-36 awarded by the U.S. Department of Energy to The Regents of The University of California. The government has certain rights in the invention.

FIELD OF THE INVENTION

The present invention relates generally to nonlinear optical materials and, more particularly, to the preparation of thin films of layered supramolecular materials having individual molecular layers which exhibit ultrafast electron and/or energy transfer in a chosen direction.

BACKGROUND OF THE INVENTION

Photoinduced charge and energy transfer in biological molecules form the basis for photosynthesis and vision. The initial absorption and electron transfer steps take place on femtosecond (fs, ($10^{-15}$ s) to picosecond ($10^{-12}$ s) timescales, and the active molecules are usually linear chain or cyclic ring systems with extended networks of π-orbitals, leading to electron delocalization along the entire molecule, strong optical absorptions, and facile electron transport even for large molecules. The prototypical molecules in photosynthesis are metal-substituted porphyrin compounds, and conjugated polyenes. The reactions which have been most heavily studied involve intermolecular electron or energy transfer between electron-donating and electron-accepting moieties. More generally, strongly allowed optical transitions in π-conjugated organic molecules typically involve substantial redistributions of the π-electron density in the excited-state. These intramolecular charge-transfer (CT) transitions play a dominant role in determining the strength of second- and third-order nonlinear optical effects (NLO).

Materials in which the optical properties (e.g. absorption coefficient, and index of refraction) may be dynamically altered by exposure to light have a wide variety of applications in nonlinear optics. Such applications include devices to control or alter properties of pulsed laser beams (modulators, optical switches) as well as signal and image processors using dynamic holograms. It is well-established that in solid-state blends of molecular materials consisting of light absorbers and electron acceptors, the separation of charge following photoexcitation (photoinduced CT) can lead to such changes in the optical properties (see e.g., D. McBranch, Curr. Opin. Solid-State and Mater. Sci., 3, 203 (1998)). Desirable NLO effects from photoinduced CT arise from several sources: (1) creation of new optical transitions from the excited-states of the donor and acceptor species, with associated changes in absorptivity and refractive index; (2) stabilization of the excited-state lifetime, offering additional control over the NLO response time; and (3) creation of space-charge fields which drive secondary NLO effects due to other NLO chromophores.

The creation of strong, excited-state absorption transitions with metastable lifetimes has led to large enhancements of reverse saturable-absorption nonlinearities for optical limiting of high-fluence pulses. Optical limiting performance enhanced by more than two orders of magnitude was reported for conjugated polymer/$C_{60}$ blended films (see, e.g., D. McBranch et al., U.S. Pat. No. 5,741,442).

The index of refraction changes associated with the creation of new CT transitions in polymer/$C_{60}$ blends were measured for steady-state laser excitation (see, e.g., K. Lee et al., Phys. Rev. B54, 10525 (1996)). Recently, ultrafast holography in these charge-transfer polymers taking advantage of both photoinduced changes in optical constants and a tunable ps response time has been demonstrated (see, e.g., E. Maniloff et al., Opt. Comm. 141, 243 (1997).

Electric-field induced, long-range charge separation in photorefractive polymers in conjunction with an ordered network of NLO chromophores, have been found to produce dynamic refractive index gratings by reorientation of dipoles with large dipole moment (field-induced birefringence) and by direct modulation of the refractive index for chromophores with high second-order molecular nonlinearity (Pockels effect). The incorporation of conjugated dye donors, $C_{60}$ acceptors, hole transport agents, and optimized NLO chromophores in transparent polymer hosts, has led to polymeric photorefractive materials with diffraction efficiencies approaching unity, and response times of a few seconds (see, e.g., S. R. Marder et al, Nature 388, 845 (1997)). These polymers have been applied to optical data storage, optical correlation and pattern recognition, and self-pumped phase conjugation (see, e.g., D. McBranch, Curr. Opin. Solid-State and Mater. Sci., 3, 203 (1998)).

Dynamic holographic materials offer promise for optical processing of information with potentially high information density. However, simply comparing the maximum diffraction efficiency or the response time for different materials does not allow an adequate comparison of their relative merits, since rapid data processing requires having both a large response and a rapid recording rate. Maniloff et al. have proposed as a figure-of-merit the temporal diffraction efficiency (TDE), defined as $\eta/\tau$, where $\eta$ is the diffraction efficiency and $\tau$ is the time constant governing the holographic buildup (see, e.g., E. Maniloff et al., Opt. Comm. 141, 243 (1997). As an example, photorefractive polymers have large efficiencies (approaching unity), but because they respond on times $\geq 1$ s, they have TDE values $\leq 1$ s$^{-1}$, for light intensities of approximately one W/cm$^2$. Holographic materials based on photo-isomerization possess TDE values in the range of $10^{-1}$–$10^{-6}$ s$^{-1}$, with recording intensities of 10–50 mW/cm$^2$. Ultrafast CT holographic materials, by contrast, show diffraction efficiencies of 2% (pump fluence 300 μJ/cm$^2$, or average intensity 300 mW/cm$^2$) with response times of less than 1 ps, for TDE values 10–12 orders of magnitude larger than previously reported dynamic holographic materials (see, e.g., E. Maniloff et al., Opt. Comm. 141, 243 (1997)).

The challenge of preparing macroscopic solid-state materials which utilize molecular photoinduced-charge transfer and nonlinear optical moieties has been addressed in several ways. Simply combining materials which have the desired individual characteristics has proved successful in the initial demonstrations of many NLO effects identified hereinabove. For optical limiting and holographic effects using excited-state CT transitions, disordered blended materials are sufficient. However, the observation of bulk photorefractive effects requires that the individual NLO chromophores be oriented with respect to each other. Orientation stability ranging from hours to months has been achieved in initially disordered materials by electric-field poling in host polymers which are cross-linkable, or which have elevated glass-transition temperatures $T_g$, in order to lock the chromophores into a metastable ordered state (see, e.g., S. R. Marder et al., Nature 388, 845 (1997)). Marder et al. have also demonstrated that dynamic reorientation could be achieved using an applied field for polymers having $T_g$ below room temperature.

An alternative strategy for constructing solid-state materials with molecular CT and NLO components is by molecular self-assembly. Using this technique, macroscopic solids have been designed and constructed molecular layer-by-layer. Several routes to solid-state self-assembly of dipolar NLO chromophores have been investigated using covalent bonding (see, e.g., H. E. Katz et al, Science 254, 1485 (1991)). Although materials having high thermal and chemical stability have been generated using these procedures, it has proven difficult to make multilayers having arbitrary thickness. Additionally, materials, which incorporate photo-induced CT effects, have not yet been produced.

Ionic self-assembly of alternating layers of positively and negatively-charged polyelectrolytes has proven to be a versatile and simple technique for rapidly constructing multi-layered organic thin films having arbitrary thickness. The surface quality and layer thickness can be extremely repeatable from layer-to-layer, and a technique for making solids for a large number of systems has been demonstrated, including transparent ionic polymers (see, e.g., G. Decher et al., Thin Solid Films 210, 831 (1992)), as well as various optically- and electrically-active species, such as phthalocyanines and porphyrins (see, e.g., T. M. Cooper et al, Langmuir 11, 2713 (1991)), conjugated polymers for thin-film, light-emitting diodes (see, e.g., J. C. Foo et al., J. Appl. Phys. 79, 7501 (1996)), and polymers with NLO chromophores as side chains (see, e.g., X. Wang et al., Macromolecular Rapid Comm. 18, 451 (1997), Y. Lvov et al., Thin Solid Film 300, 107 (1997), and K. M. Lenahan et al., Adv. Mater. 10, 853 (1998). In the latter work, it was observed that spontaneous ordering of the NLO chromophores occurs at the ionic interface, and that a high degree of net orientation is maintained for several layers. However, materials which incorporate photoinduced CT effects have not yet been produced by either covalent or ionic self-assembly methods.

Accordingly, it is an object of the present invention to provide a method for the preparation of layered supramolecular materials having individual molecular layers in which charge transfer in a controlled direction occurs.

Another object of the present invention is to provide a method for the preparation of materials having a preferred direction for charge transfer over the entire structure which produces enhanced nonlinear optical effects such as photoinduced changes in the refractive index.

Yet another object of the invention is to provide a method for the preparation of layered supramolecular materials having individual molecular layers in which energy transfer in a controlled direction occurs.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method for generating materials which exhibit photoinduced charge transfer having a controlled direction hereof may include the steps of: depositing a donor layer onto a substrate, depositing a nonlinear optical material onto the donor layer, and depositing an acceptor layer onto the nonlinear optical material, whereby photoinduced charge transfer is achieved between the donor layer and the acceptor layer, thereby enhancing the nonlinear optical properties of the nonlinear optical material.

In another aspect of the present invention in accordance with its objects and purposes the method for generating materials which exhibit energy transfer having a controlled direction hereof includes the steps of: depositing a donor layer onto a substrate, depositing a transparent spacer layer onto the donor layer; and depositing an acceptor layer onto the transparent spacer layer, whereby energy transfer is achieved between the donor layer and the acceptor layer.

Benefits and advantages of the invention may include the enhancement of the nonlinear optical properties of nonlinear optical materials.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Briefly, the present invention includes a method for preparing materials for nonlinear optical applications which combine the following elements: (1) Intermolecular photoinduced charge transfer between donor and acceptor molecules; (2) Ordering of superlattices in each molecular layer such that the charge transfer in each layer has a preferred spatial orientation; (3) Regular alternation of the layered structure to achieve a common spatial direction for the photoinduced dipoles at each molecular interface (bulk symmetry breaking); and (4) Photoinduced changes in the optical constants of the ordered superlattice in response to incident light. The donor and acceptor layers may include conjugated polymers, fullerenes, porphyrins and phthalocyanines, and other molecular dyes chosen such that photoinduced charge transfer is achieved between the donor/acceptor pair.

The films used by way of example have several novel properties. First, the conjugated polymer employed is a water-soluble derivative of the highly investigated polyphenylene vinylene (PPV) family. This polymer is an anionic, high molecular weight polymer having high luminescence quantum efficiency, which requires no post-assembly processing (such as thermal conversion) to achieve the fully conjugated form. Second, a series of cationic dendrimers (see, e.g., V. A. Kabanov et al., Macromolecules 51, 5142 (1998)) has been utilized as binding layers for the PPV active layers. These dendrimers allow the formation of highly luminescent solid films, where the charge density in the cationic binding layer can be controlled by changing pH of the dendrimer solution. Previously, only a handful of polycations have been used in the reports of polyelectrolyte self-assembly: poly(ethylene-imine) (PEI), poly(allyl-amine hydrochloride) (PAH), and poly(diallyl-amine) (PDDA). The poly(propylene imine) dendrimer of the present invention is a globular rather than linear polymeric macromolecule. It has been determined by the present inventor that the nature of the polycation binder plays a pivotal role in determining the structure and optical properties of the self-assembled films.

A number of novel optical effects have been observed in the multilayers of the present invention which result from directional energy and charge transfer between adjacent polymer layers. Quenching of the efficient PL is observed in the multilayered films as the thickness (number of PPV layers) increases. This effect is similar to the self-quenching observed in solution-cast films of soluble PPVs, and indicates interpenetration of adjacent PPV layers which is attributed to efficient formation of non-emissive inter-chain excitations (see, e.g., M. Yan et al., Phys. Rev. Lett. 72, 1104 (1994)). The self-quenching can be eliminated by inserting additional spacer layers of transparent, inert polyelectrolytes between the active PPV layers. A strong PL red shift of up to 75 nm is observed as additional PPV layers are added to the structure, and this red shift is enhanced with the addition of spacer layers. The disappearance of self-quenching implies a separation of adjacent PPV layers (no direct electronic wavefunction overlap). Since the PL red shift persists (and even increases) in the absence of such overlap, it is unlikely that the red shift arises due to coherent quantum confinement by the multilayer film; rather the shift is the result of a changing conformation of the PPV chains within each layer, such that successive layers are deposited with progressively extended geometry, and hence extended conjugation length and red-shifted absorption and emission. Moreover, the red shift is accompanied by the disappearance of emission from the blue-emitting initial layers, implying long-range energy transfer. Hence, the red shift may be attributed to ultrafast Förster energy transfer between PPV layers, with a preferred direction toward the top of the film.

Figure 1:
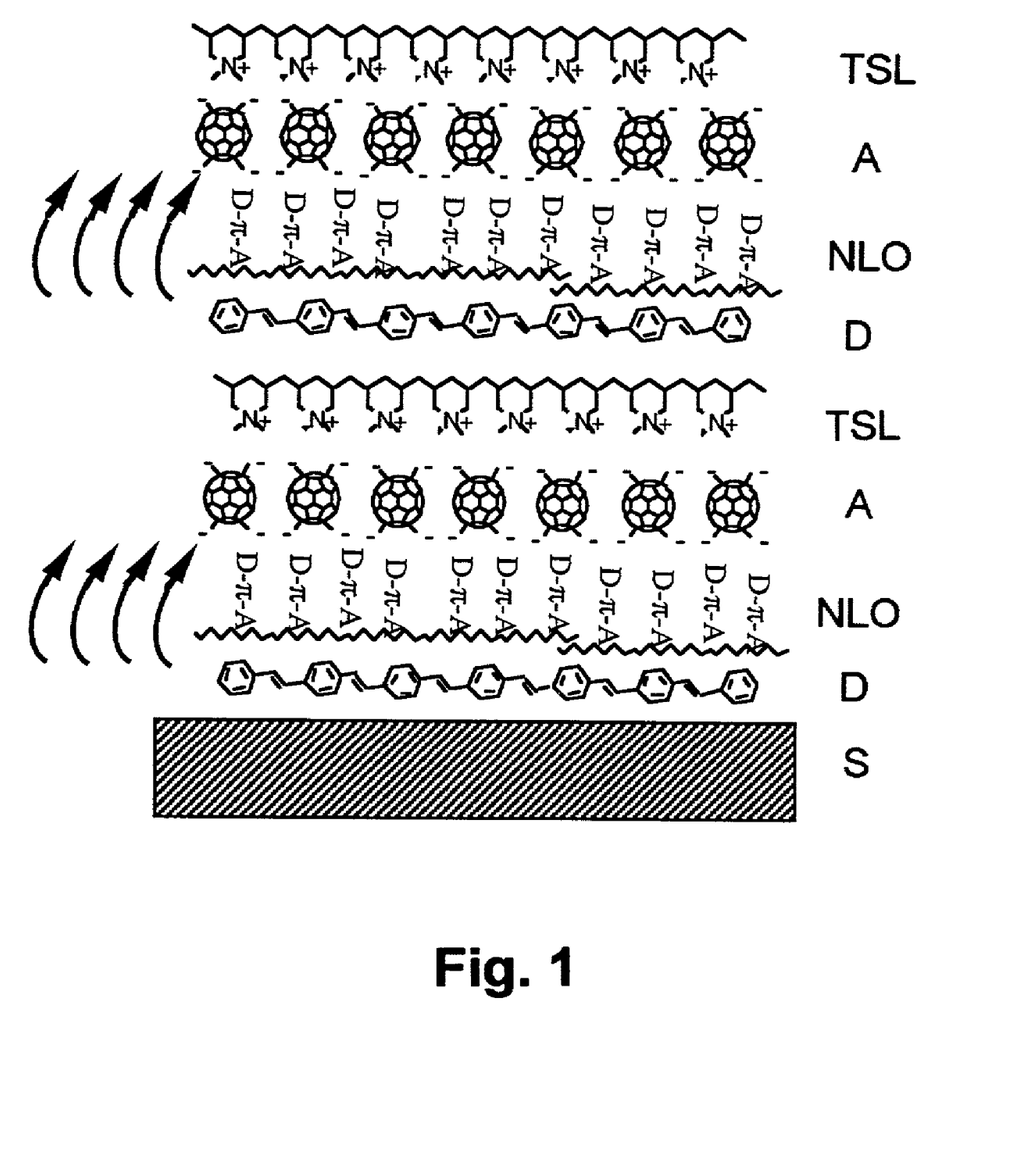
FIG. 1 is a schematic representation of an ordered molecular superlattice consisting of a substrate, S, a donor, D, a molecular nonlinear optical chromophore, NLO, an acceptor, A, and a transparent spacer layer, TSL.
Figure 2A:
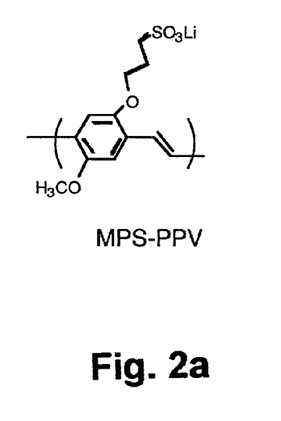
FIGS. 2a–2c show examples of the donor, NLO chromophore and acceptor schematically represented in FIG. 1 hereof, respectively.
Figure 2B:
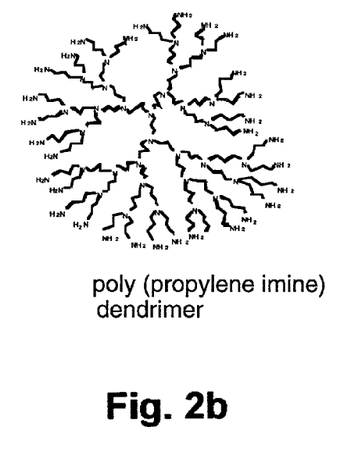
Figure 2C:
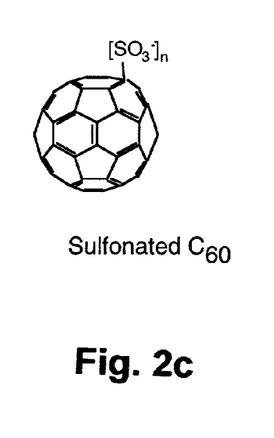

Reference will now be made in detail to the present preferred embodiments of the invention examples of which are illustrated in the accompanying drawings. Similar or identical structure will be identified by identical callouts. Turning now to FIG. 1, a schematic representation of the ordered molecular superlattice of the present invention is shown to include substrate, S, donor molecule, D, molecular nonlinear optical chromophore, NLO, acceptor molecule, A, and transparent isolating layer, TSL. A prototype of this material was constructed one molecular layer at a time using alternating self-assembly by alternately dipping a properly-prepared glass substrate into a water solution of oppositely-charged ionic molecules (described hereinabove as polyelectrolyte self-assembly). The controlled formation of a regular superlattice using molecular building blocks having a desired function, together with charge transfer and energy transfer in a preferred orientation relative to the substrate have been demonstrated. The following molecular building blocks were used. For the donor layer, the anionic conjugated polymer poly(2,5-methyl-propyloxy sulfonate phenylene vinylene)was used (MPS-PPV; FIG. 2a hereof). A number of poly-electrolytes were employed for the transparent spacer layers, including poly(ethylene-imine) (PEI), poly(allyl-amine hydrochloride) (PAH), poly(di-allyl-amine) (PDDA), and poly (styrene sulfonate) (PSS). However, the optimal results were obtained by using cationic poly(propylene-imine) dendrimers (generation 3.0), purchased from Aldrich Chemical Co. and used without further purification (See FIG. 2b hereof. Sulfonated $C_{60}$ was used for the acceptor layer (FIG. 2c). Self-assembly of the non-linear optical chromophore having preferred orientation has already been demonstrated using commercially-available poly-electrolyte, PAZO (see, e.g., X. Wang et al., supra, Y. Lvov et al., supra, and K. M. Lenahan et al., supra).

Figure 3:
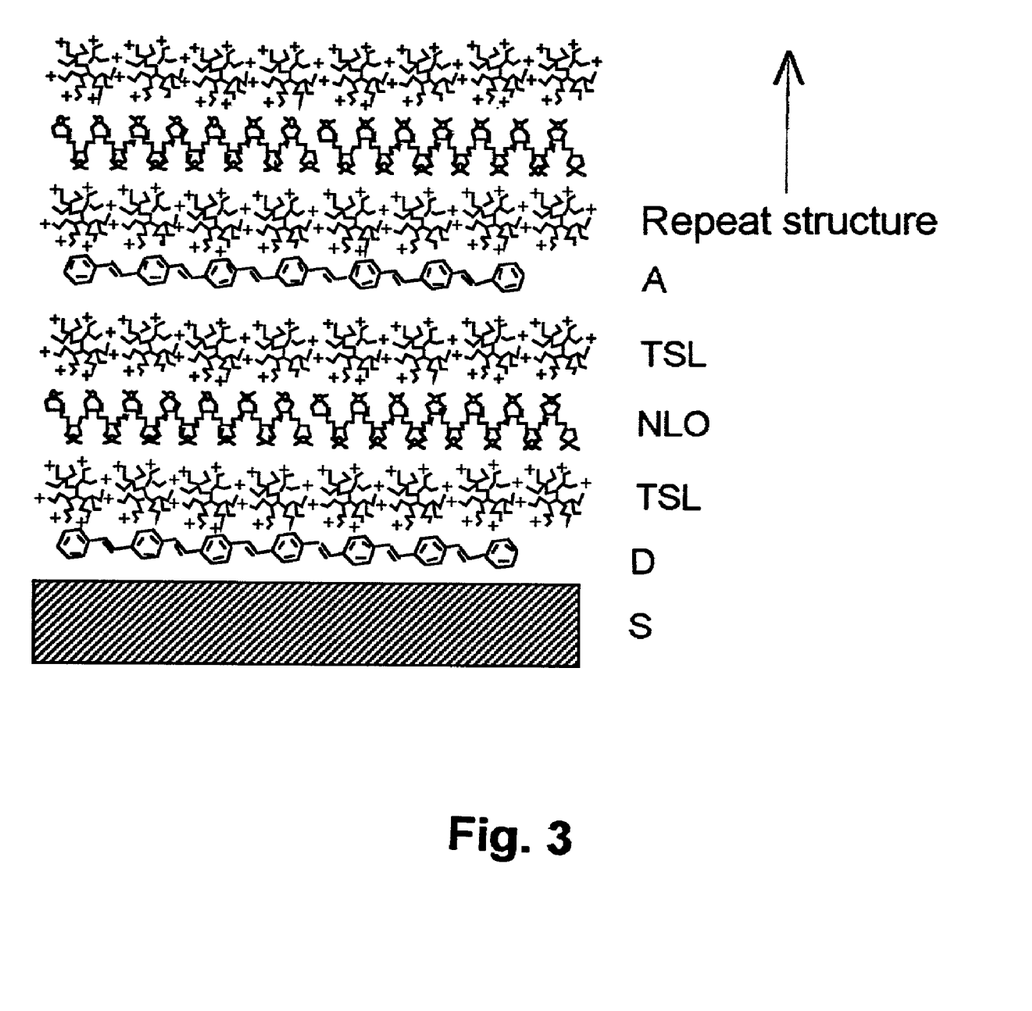
FIG. 3 is a schematic representation of the conjugated polymer superlattice used to demonstrate controlled unidirectional energy transfer according to the teachings of the present invention.
Figure 4:
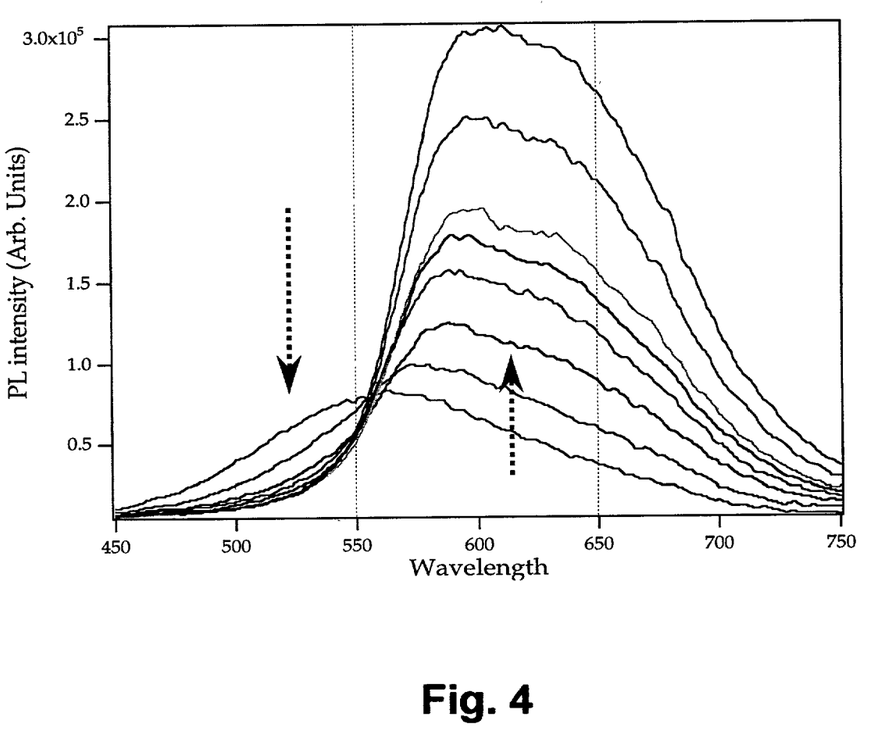
FIG. 4 shows fluorescence spectra for the self-assembled film schematically shown in FIG. 3, hereof as a function of wavelength for increasing numbers of MPS-PPV (donor) layers and, in particular, shows the disappearance of blue emission (500–550 nm) in the lower layers as the structure is assembled, indicating unidirectional energy transfer to the higher layers.

FIG. 3 shows the superlattice structure used to observe controlled unidirectional energy transfer. Each multilayer in the repeat structure has the following form: $[PPV/D/PSS/D]_m$, where D denotes dendrimer, and m is the number of MPS-PPV layers. FIG. 4 shows that a red shift of the photoluminescence (PL) spectra occurs with increasing m. It can be seen that the blue emission from the first and second layers (500–550 nm) disappears as the number of PPV layers increases, while the red emission (600–700 nm) increases with increasing number of PPV layers. Note that the optical density of the films is always much less than one, so that re-absorption of the emitted light can be neglected. The disappearance of blue emission implies either that the conformation of chains in the first layers is changed in response to the adsorption of successive layers in the stack (cooperative conformation change), or that the excitons in the first layers are transferred to higher layers in the stack. To rule out the first mechanism, a multilayer superlattice was constructed having a single MPS-PPV layer and multiple inert layers $(PPV/D[PSS/D]_m$, where m=1, 3, 5). In all cases, the adsorption of additional inert polymer layers induced a small, but consistent, blue shift of the PL spectrum for the single PPV layer, indicating that the influence of additional polyelectrolyte layers alone is to slightly increase the disorder (and decrease the conjugation length) of the PPV layer. Hence, the most likely explanation for the decrease in blue emission in FIG. 4 is that efficient energy transfer takes place from the MPS-PPV layers closest to the substrate, toward the MPS-PPV layers at the top surface.

This unidirectional exciton migration is likely due to efficient long-range Förster transfer from the more coiled initial layers to the more extended upper layers. Such a controlled energy transfer is similar to light-harvesting/energy transfer antennae designed from chains or arrays of metallo-porphyrin molecules. This type of efficient unidirectional energy transfer (followed by chemical reaction) underlies most photosynthetic reactions in biology. In conjugated polymers, the direction of energy migration can be controlled by changing the conformation of the chains, and this system thus offers a degree of tunability unavailable to small molecules with fixed geometries and electronic energies. This observation may lead to a number of applications; that is, selecting the spatial position of the emission in polymeric light-emitting diodes away from the electrodes, collecting the absorbed energy from a volume of solid material and channeling it to the surface for chemical reaction (photocatalysis) or electrical work (photovoltaics), or designing optimized polymer lasers with energy transfer to a preferred emitting layer.

Figure 5:
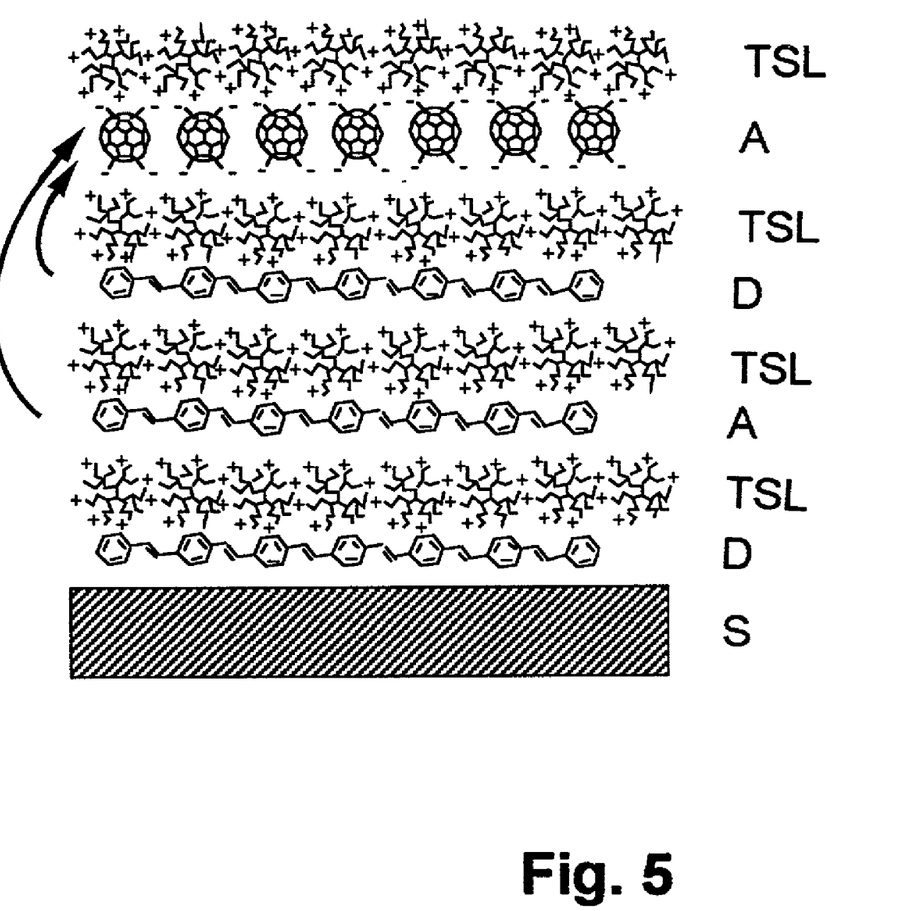
FIG. 5 is a schematic representation of a self-assembled molecular superlattice suitable for directional charge-transfer.

In addition to this unidirectional energy transfer, charge transfer superlattices can be formed by additionally incorporating $C_{60}$ acceptor layers. The structure for directional charge transfer is shown in FIG. 5. The superlattice structure is similar to the superlattice shown in FIG. 3, with the addition of a single self-assembled $C_{60}$ outermost layer of the film.

Figure 6A:
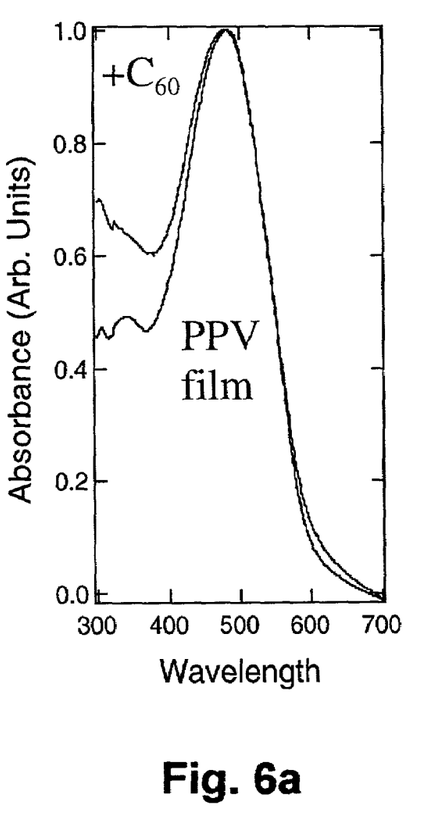
FIGS. 6a and 6b show the absorbance and emission of the charge-transfer superlattice shown in FIG. 5 hereof: (a) before and (b) after addition of the final $C_{60}$ layer.
Figure 6B:
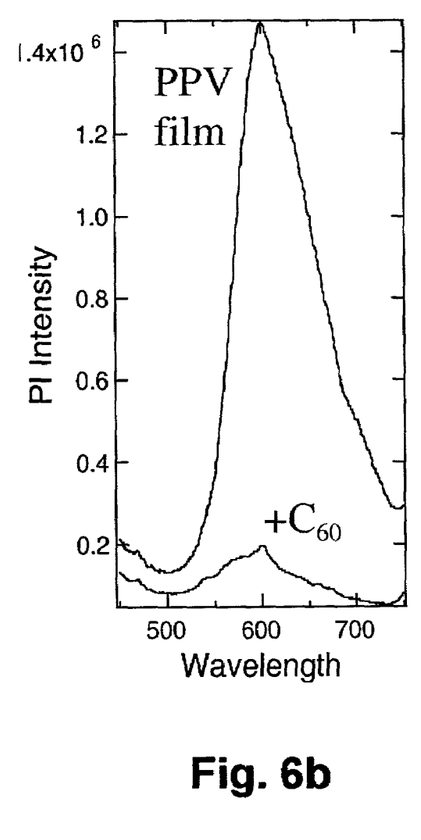

The absorption and emission spectra of the film before and after deposition of the fullerene acceptor layer are shown in FIGS. 6a and 6b, respectively. Although the fullerene layer induces only a minor change in the absorbance of the film, the emission from the conjugated polymer layers is nearly completely quenched. This indicates efficient charge transfer to the fullerene top layer, with high efficiency and preferred direction. Hence, the required molecular level control over photo-induced charge transfer, together with ordered molecular orientation, have been demonstrated which constitutes a proof-of-principle of the general class of nonlinear optical solids according to the teachings of the present invention.

Having generally described the invention, the following EXAMPLE will provide additional details thereof.

Example

The anionic conjugated polymer poly(2,5 methyl-propyloxy sulfonate phenylene vinylene) (MPS-PPV) was synthesized according to well-known synthetic procedures. Cationic and anionic transparent binder compounds, including poly(propylene-imine) dendrimers (generation 3.0), poly (styrene sulfonate) (PSS) and PEI were purchased from Aldrich Chemical Co. and used without further purification. De-ionized water (DI) having >18MΩ resistivity from a Nanopore still was used for all aqueous solutions and rinses. The glass slides were cleaned by first placing them in an $H_2O_2/H_2SO_4$ (30%/70%) solution mixture at 80° C. for one hour and then sonicating them in 200 ml of de-ionized water for 30 min. These substrates were later rinsed with pure ethanol to produce hydrophilic surfaces. Concentrations of all polycation and polyanion aqueous solutions were in the range of $10^{-3}$ M. Self-assembled multilayer films were made by first immersing the substrate into the polycation solution and then in the polyanion solution (5 min. for each solution (beginning with polycation solution))with a rinse step with excess DI water occurring after each deposition step. Subsequent to each deposition and rinsing step, the sample was air dried before UV-visible absorption and photoluminescence spectra were taken.

Several polycations combined with the anionic conjugated polymer (MPS-PPV) were employed to fabricate self-assembled multilayers. The absorption spectra for multilayer films as increasing numbers of bilayers of MPS-PPV/polycation are added to the films, using both PEI and the poly(propylene imine) dendrimer as polycations show a reproducible linear adsorption of PPV onto the glass substrate due to electrostatic self-assembly. Comparing the absolute absorbance for films prepared using two different spacer polycations (PEI and dendrimer), it is clear that approximately seven times greater optical density is achieved for each anionic MPS-PPV layer when PEI is used as the alternating polycation, when compared to the dendrimer polycation. This is similar to data reported for self-assembly of films of non-conjugated anionic polyelectyrolytes using PEI and PDDA as polycations, for which a five-fold increase in individual layer thickness was reported for PEI vs. PDDA (See, e.g., S. Dante et al., Langmuir 15, 193 (1999) were this effect was attributed to the fact that PEI is a highly branched polymer, which results in more polymer entanglement between each adjacent layer, and higher adsorption.

A red shift of the absorption spectra as the thickness increased was also observed for both samples. A similar red shift attributed to either conformation changes of the polymer chains within individual layers, or to quantum confinement of coherent electrons within the entire multilayer, has been observed in self-assembled films formed from MPS-PPV made by thermal conversion from a polyelectrolyte precursor. The wavelength of the absorbance peak approaches a limiting value of 450 nm for MPS-PPV/PEI films, and 480 nm for MPS-PPV/dendrimer films, as the number of layers is increased. It should be mentioned that the only variable for preparing the two types of samples is the polycation species itself. These results show that the polycation plays a dominant role in determining the final structure, thickness, and optical properties of the self-assembled conjugated polymer films.

The MPS-PPV/PEI multilayers exhibit strong self-quenching of the PL as the film thickness increases; that is the photoluminescence (PL) quantum efficiency (PLQE) decreases strongly with increasing numbers of bilayers, and nearly complete quenching is observed for five or more bilayers. The MPS-PPV/dendrimer multilayers also show decreasing PLQE with increasing numbers of bilayers, but the quenching these films is much less dramatic. The PLQE for the first bilayer of MPS-PPV/dendrimer is nearly two orders-of-magnitude greater than that for the first MPS-PPV/PEI bilayer, and the relative PLQE in PPV/dendrimer films saturates above approximately 8 bilayers at about 50% of the PLQE value for the first bilayer. This PL self-quenching is similar to that observed in cast neat films of alkoxy-substituted PPVs, and has been attributed to inter-chain coupling, and the formation of non-emissive, tightly-bound inter-chain states (inter-chain excitons, or excimers); that is, the PL quenching indicates a large degree of interpenetration of adjacent layers, especially for the PPV/PEI bilayers.

Accompanying the decreasing PLQE (in both types of sample) is a strong red shift of the PL spectra. To distinguish between the effects of self-quenching, and the red shift of the absorption and PL spectra, a series of measurements of more complex multilayered structures were performed, in which variable numbers of inert spacer layers were inserted between each active MPS-PPV layer. First, a multilayer film with three spacer layers was constructed by adding a single PSS layer in between two dendrimer layers, forming a structure of the form $[MPS-PPV/D/PSS/D]_m$, where D denotes dendrimer, and m is the number of MPS-PPV layers. A red shift of the PL spectra with increasing m similar to that observed for the $[MPS-PPV/D]_m$ film was observed. However, the self-quenching effect is no longer evident for the $[MPS-PPV/D/PSS/D]_m$ film, and a monotonic increase in PLQE with increasing m was instead observed. As discussed hereinabove, this is in direct contrast to the $[MPS-PPV/D]_m$ film, for which the PLQE decreases as m increases. If the PPV layers are further separated by using a five-layer spacer ($[MPS-PPV/D/PSS/D/PSS/D]_m$), an even stronger growth in PLQE with m is observed, in addition to a similar red shift of the PL spectra. Hence, the self-quenching can be reversed by increasing the distance between adjacent MPS-PPV layers. Since the formation of PL-quenching excimers on adjacent chains requires a coherent electronic state across two chains, this result implies that adding additional spacer layers results in the isolation of individual MPS-PPV layers, from the standpoint of direct overlap of electronic wavefunctions. The other implication is that for the dendrimer/ PPV films, interchain interactions (and self-quenching) within individual layers are of secondary importance to the quenching between layers.

Since the PL red shift is preserved and even enhanced as the number of spacer layers is increased; that is, with electronic isolation of individual MPS-PPV layers, this shift must be the result of a conformational change of the individual MPS-PPV polymer chains in successive layers of the self-assembled films which results from the change from a coiled conformation to a more extended conformation, accompanied by an increased conjugation length in the polymer chains. As stated hereinabove, the influence of additional inert polyelectrolyte layers alone is to slightly increase the disorder (and decrease the conjugation length) of the polymer chains in the MPS-PPV layer, resulting in a blue shift of the emission of a single MPS-PPV layer in the absence of additional MPS-PPV layers. Hence, the explanation for the disappearance of blue emission in FIG. 4 is that efficient energy transfer takes place from the MPS-PPV layers closest to the substrate, toward the MPS-PPV layers at the top surface, which may be attributed to efficient long-range Forster transfer from the more coiled (blue) initial layers to the more extended (red) upper layers. The increase in PLQE as the film grows is also consistent with this assignment, since the more extended (less disordered) chains should be expected to have fewer nonradiative relaxation pathways. Such a controlled energy transfer is similar to light-harvesting/energy transfer antennae designed from chains or arrays of metallo-porphyrin molecules (see, e.g., F. R. Li et al., J. Mater. Chem. 7 1245 (1997)), efficient unidirectional energy transfer processes (followed by controlled chemical reaction) underlie most photosynthetic reactions in biology. In conjugated polymers, the direction of energy migration can be controlled by changing the conformation of the chains, and this system thus offers a degree of tunability unavailable to small molecules with fixed geometries and electronic energies.

As stated hereinabove, the present invention indicates a film formation mechanism which leads to more tightly coiled initial layers, progressing to more extended subsequent layers. The charge density of the MPS-PPV molecules in solution depends strongly on the chain conformation (degree of chain extension). Simulations of interactions of charged rods and surfaces have shown that the efficient binding of polyelectrolytes at an oppositely-charged surface is driven mostly by entropy, since the Coulomb binding energy is similar for the surface counter-ions and the polyelectrolytes (see, e.g., J. Mashl et al., J. Chem. Phys. 110, 2219 (1999)). The contribution of entropy to the free energy is therefore optimized by releasing the counter-ions to the bulk solution and by binding the macromolecules (polyelectrolytes) to the surface isoelectrically. Hence, the lowest free energy is obtained when the surface area occupied by the MPS-PPV chains adsorbed at the interface is sufficient to exactly balance the charge density of the top surface. In this way, it is expected that tuning of the charge density of the initial surface should result in very different film conformations. As the multilayer is built up, the substrate is screened by the polyelectrolyte film, and the charge density at the surface is controlled by the morphology and intrinsic charge density of the polycation layer. Photoluminescence spectra for two films consisting of a single MPS-PPV layer sandwiched between two dendrimer layers (generation 3.0) have been investigated. The only difference between the two films is that the dendrimer layers for the film having an observed spectrum which is shifted to shorter wavelengths were deposited from a solution of pH 1, while for the film having an observed spectrum at longer wavelengths, a pH value of 12 was used in the dendrimer solution. In each case, the pH for the MPS-PPV solution was neutral. For low pH values, the imine shell around the perimeter of the dendrimer is fully protonated, resulting in a higher surface charge density. As expected, this higher charge density results in a conjugated polymer layer in which the individual polymer chains are more coiled, and hence blue-shifted, relative to the layers deposited over dendrimers with lower charge density. The films assembled using dendrimer solutions with low pH also have greater thickness of the conjugated polymer layer, and a larger relative interpenetration in multilayers (as judged by PL self-quenching).

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for generating materials which exhibit photoinduced charge transfer having a controlled direction, which comprises the steps of:
    (a) depositing a donor layer directly onto a substrate, the substrate consisting of non-conductive glass, wherein the donor layer comprises at least one of an electron donor and an energy donor;
    (b) depositing a nonlinear optical chromophore material directly onto the donor layer;
    (c) depositing an acceptor layer directly onto the nonlinear optical chromophore material, wherein the acceptor layer comprises at least one of an electron acceptor and an energy acceptor; and
    (d) self-assembling the donor layer, the nonlinear optical chromophore material layer, and the acceptor layer into a superlattice, whereby photoinduced charge transfer is achieved between the donor layer and the acceptor layer, thereby enhancing the nonlinear optical properties of the nonlinear optical chromophore material.

2. The method for generating materials which exhibit photoinduced charge transfer having a controlled direction as described in claim 1, wherein the donor layer and acceptor layer are selected from the group consisting of conjugated polymers, fullerenes, porphyrins, and phthalocyanines.

3. The method for generating materials which exhibit photoinduced charge transfer having a controlled direction as described in claim 2, wherein the conjugated polymers include conjugated polyelectrolytes.

4. The method for generating materials which exhibit photoinduced charge transfer having a controlled direction as described in claim 2, wherein the conjugated polymers include the water-soluble, anionic form of poly(2,5 methylpropyloxy sulfonate phenylene vinylene).

5. The method for generating materials which exhibit photoinduced charge transfer having a controlled direction as described in claim 2, wherein the fullerenes include functionalized derivatives of $C_{60}$ having ionic groups such that the fullerenes are rendered water-soluble.

6. The method for generating materials which exhibit photoinduced charge transfer having a controlled direction as described in claim 1, further including the steps of depositing at least one transparent spacer layer comprising at least one substantially inert polyelectrolyte on the acceptor layer and depositing a second donor layer on the at least one transparent spacer layer, such that self-quenching is eliminated.

7. The method for generating materials which exhibit photoinduced charge transfer having a controlled direction as described in claim 6, wherein the at least one polyelectrolyte is selected from the group consisting of: poly(ethylene-imine), poly(allyl-amine hydrochloride), poly(di-allyl-amine), poly(styrene sulfonate) and poly(propylene-imine) dendrimers.

8. The method for generating materials which exhibit photoinduced charge transfer having a controlled direction as described in claim 1, wherein the donor layer, the acceptor layer, and the nonlinear optical chromophore material layer are deposited using ionic self-assembly from aqueous solution.

9. The method for generating materials which exhibit photoinduced charge transfer having a controlled direction as described in claim 8, wherein the conformation of the donor layer is controlled by varying the pH of the aqueous deposition solution.

10. The method for generating materials which exhibit photoinduced charge transfer having a controlled direction as described in claim 1, wherein the nonlinear optical chromophore material includes polymers having nonlinear optical chromophores as side-chain substituents to the polymer backbone.

11. The method for generating materials which exhibit photoinduced charge transfer having a controlled direction as described in claim 1, wherein the nonlinear optical chromophore material includes PAZO.

12. A method for generating materials which exhibit energy transfer having a controlled direction, which comprises the steps of:
(a) depositing a donor layer directly onto a substrate, the substrate consisting of non-conductive glass, wherein the donor layer comprises at least one of an electron donor and an energy donor;
(b) depositing a transparent spacer layer comprising at least one substantially inert polyelectrolyte directly onto the donor layer; and
(c) depositing an acceptor layer onto the transparent spacer layer, wherein the acceptor layer comprises at least one of an electron acceptor and an energy acceptor, and wherein the donor layer and acceptor layer are selected from the group consisting of conjugated polymers, fullerenes, porphyrins, and phthalocyanines, wherein the fullerenes include functionalized derivatives of $C_{60}$ having ionic groups such that the fullerenes are rendered water-soluble; and
(d) self-assembling the donor layer, the transparent spacer layer, and the acceptor layer into a superlattice, whereby energy transfer is achieved between the donor layer and the acceptor layer.

13. The method for generating materials which exhibit energy transfer having a controlled direction as described in claim 12, wherein the conjugated polymers include conjugated polyelectrolytes.

14. The method for generating materials which exhibit energy transfer having a controlled direction as described in claim 12, wherein the conjugated polymers include the water-soluble, anionic form of poly(2,5 methyl-propyloxy sulfonate phenylene vinylene).

15. The method for generating materials which exhibit energy transfer having a controlled direction as described in claim 12, further including the steps of depositing a layer of nonlinear optical chromophore material onto the transparent spacer layer and depositing a second transparent spacer layer on the layer of nonlinear optical chromophore material such that the second transparent spacer layer is disposed between the nonlinear optical chromophore material layer and the acceptor material.

16. The method for generating materials which exhibit energy transfer having a controlled direction as described in claim 15, wherein the nonlinear optical chromophore material includes polymers having nonlinear optical chromophores as side chain substituents to the polymer backbone.

17. The method for generating materials which exhibit energy transfer having a controlled direction as described in claim 15, wherein the nonlinear optical chromophore material includes PAZO.

18. The method for generating materials which exhibit energy transfer having a controlled direction as described in claim 17, wherein the poly-electrolytes are selected from the group consisting of: poly(ethylene-imine), poly(allyl-amine hydrochloride), poly(di-allyl-amine), poly(styrene sulfonate) and poly(propylene-imine) dendrimers.

19. The method for generating materials which exhibit energy transfer having a controlled direction as described in claim 12, wherein the donor layer, the acceptor layer, and the transparent spacer layer are deposited using ionic self-assembly from aqueous solution.

20. The method for generating materials which exhibit energy transfer having a controlled direction as described in claim 19, wherein the conformation of the donor layer is controlled by varying the pH of the aqueous deposition solution.

21. The method for generating materials which exhibit photoinduced charge transfer having a controlled direction as described in claim 1, wherein the donor layer comprises poly(2,5 methyl-propyloxy sulfonate phenylene vinylene), the nonlinear optical layer comprises PAZO, and the acceptor layer comprises at least one fullerene.

22. The method for generating materials which exhibit photoinduced charge transfer having a controlled direction as described in claim 21, further including the step of inserting at least one transparent spacer layer between neighboring donor and acceptor layers, wherein the transparent spacer layer comprises at least one of poly(ethylene-imine), poly(allyl-amine hydrochloride), poly(di-allyl-amine), poly(styrene sulfonate), and a poly(propylene-imine) dendrimer.

23. The method for generating materials which exhibit energy transfer having a controlled direction as described in claim 12, wherein the donor layer comprises poly(2,5 methyl-propyloxy sulfonate phenylene vinylene), the transparent spacer layer comprises at least one of poly(ethylene-imine), poly(allyl-amine hydrochloride), poly(di-allyl-amine), poly(styrene sulfonate), and a poly(propylene-imine) dendrimer, and the acceptor layer comprises at least one fullerene.

24. The method for generating materials which exhibit energy transfer having a controlled direction as described in claim 12, further including the step of depositing a layer of nonlinear optical chromophore material onto the transparent spacer layer and the step of depositing a second transparent spacer layer between the nonlinear optical chromophore material layer and the acceptor material.

* * * * *